(12) United States Patent
Watanabe et al.

(10) Patent No.: US 8,438,836 B2
(45) Date of Patent: May 14, 2013

(54) ABNORMALITY DETERMINATION APPARATUS FOR ELECTRICALLY HEATED CATALYST

(75) Inventors: Takashi Watanabe, Gotenba (JP); Atsushi Takara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 836 days.

(21) Appl. No.: 12/314,898

(22) Filed: Dec. 18, 2008

(65) Prior Publication Data

US 2009/0211233 A1 Aug. 27, 2009

(30) Foreign Application Priority Data

Feb. 22, 2008 (JP) .................. 2008-040841

(51) Int. Cl.
*F01N 3/00* (2006.01)
(52) U.S. Cl.
USPC .......................................................... 60/277
(58) Field of Classification Search .................. 219/494, 219/497; 60/277
See application file for complete search history.

(56) References Cited

U.S. PATENT DOCUMENTS

| | | | | |
|---|---|---|---|---|
| 5,555,725 A | * | 9/1996 | Shimasaki et al. | 60/277 |
| 5,754,032 A | * | 5/1998 | Aoki et al. | 322/28 |
| 5,758,492 A | | 6/1998 | Kato et al. | |
| 7,110,904 B2 | * | 9/2006 | Lippa et al. | 702/102 |
| 2008/0275600 A1 | * | 11/2008 | Rask et al. | 701/22 |
| 2010/0115927 A1 | * | 5/2010 | Sano et al. | 60/287 |
| 2010/0205939 A1 | * | 8/2010 | Sano et al. | 60/276 |
| 2010/0280698 A1 | * | 11/2010 | Ichikawa | 701/22 |

FOREIGN PATENT DOCUMENTS

| | | |
|---|---|---|
| DE | 42 35 113 A1 | 4/1994 |
| DE | 199 63 277 A1 | 7/2000 |
| JP | 6-823 * | 1/1994 |
| JP | A-8-61048 | 3/1996 |
| JP | A-10-169433 | 6/1998 |
| JP | A-11-210448 | 8/1999 |
| JP | A-2006-180665 | 7/2006 |

OTHER PUBLICATIONS

Aug. 17, 2009 Office Action issued in the Japanese Patent Application No. 2008-040841 (with translation).
Office Action issued in German Patent Application No. 102009003469.2 dated Jun. 27, 2011 (with translation).

* cited by examiner

*Primary Examiner* — Thomas Denion
*Assistant Examiner* — Matthew T Largi
(74) *Attorney, Agent, or Firm* — Oliff & Berridge, PLC

(57) ABSTRACT

An abnormality determination apparatus for an electrically heated catalyst provided in a plug-in hybrid vehicle having a battery that is charged by connecting an external charging device to an external electric power supply is equipped with an abnormality determination portion that makes a determination on an abnormality in the electrically heated catalyst when the external charging device is connected to the external electric power supply.

17 Claims, 3 Drawing Sheets

ABNORMALITY DETERMINATION APPARATUS FOR ELECTRICALLY HEATED CATALYST

INCORPORATION BY REFERENCE

The disclosure of Japanese Patent Application No. 2008-040841 filed on Feb. 22, 2008 including the specification, drawings and abstract is incorporated herein by reference in its entirety.

BACKGROUND OF THE INVENTION

1. Field of the Invention

The invention relates to a technical field of making a determination on an abnormality in an electrically heated catalyst provided in an exhaust passage of a plug-in hybrid vehicle.

2. Description of the Related Art

In the background art of the invention, there is proposed an art for making a determination on an abnormality in an electrically heated catalyst (hereinafter referred to as an EHC as well) disposed in an exhaust passage. For example, Japanese Patent Application Publication No. 8-61048 (JP-A-8-61048) proposes an art for making a determination on an abnormality in an EHC on the basis of a catalyst temperature, a catalyst resistance, an electric power consumption, and the like at the time of energization of the EHC. Further, Japanese Patent Application Publication No. 11-210448 (JP-A-11-210448) describes a hybrid vehicle provided with an EHC.

In recent years, there have been developed plug-in hybrid vehicles using as motivity an electric power obtained through charging from an external electric power supply such as an electric power supply for home use or the like. In making a determination on an abnormality in an EHC provided in such a plug-in hybrid vehicle, the following problems are assumed.

In a plug-in hybrid vehicle, the electric power of a battery as an output tends to change in accordance with the running condition set by a driver. In some cases, therefore, a stable electric power for an EHC cannot be ensured to make a determination on an abnormality, the accuracy in making a determination on an abnormality is not guaranteed with ease, and an erroneous determination is made. In order to prevent such an erroneous determination and the like, it is conceivable to limit the output of the battery, which is used for running, with a view to thereby ensuring a stable electric power during a determination on an abnormality. However, when this measure is adopted, the energy for running that is accumulated in the battery is consumed to make a determination on an abnormality. Therefore, a deterioration in EV running performance or a deterioration in energy efficiency resulting from an increase in the load imposed on an engine may be caused. Further, since the plug-in hybrid vehicle is originally intended for the enlargement of EV running performance, the electric power of the battery tends to be used for EV running by priority. It is therefore considered that the electric power for making a determination on an abnormality in the EHC is not ensured and that the frequency with which a determination on an abnormality is made decreases.

On the other hand, while the vehicle is running, a changeover is made among EV running by a motor using an electric power from the battery, HV running accompanied by the start-up of an engine, and the like, depending on various conditions. It is therefore difficult to keep the temperature of the EHC constant. Further, out of consideration to the influence of a disturbance such as head-on wind, the processing itself of making a determination on an abnormality in the EHC tends to be complicated. In addition, when an attempt is made to give priority to the securement of the accuracy in making a determination on an abnormality in such a case, a determination on an abnormality is made only on a limited condition. As a result, the frequency with which a determination on an abnormality is made tends to decrease.

Neither Japanese Patent Application Publication No. 8-61048 (JP-A-8-61048) nor Japanese Patent Application Publication No. 11-210448 (JP-A-11-210448) describes how to make a determination on an abnormality in an EHC provided in a plug-in hybrid vehicle appropriately.

SUMMARY OF THE INVENTION

The invention provides an abnormality determination apparatus for an electrically heated catalyst that can appropriately make a determination on an abnormality in an EHC provided in a plug-in hybrid vehicle.

An abnormality determination apparatus for an electrically heated catalyst according to a first aspect of the invention is provided in a plug-in hybrid vehicle having a battery that is charged by connecting an external charging device to an external electric power supply, and is equipped with an abnormality determination portion that makes a determination on an abnormality in the electrically heated catalyst when the external charging device is connected to the external electric power supply.

The abnormality determination apparatus for the electrically heated catalyst according to the foregoing first aspect of the invention is preferably utilized for a plug-in hybrid vehicle that is equipped with an engine operating through the combustion of fuel and a motor operating with the aid of an electric power with which a battery is charged and is configured to allow the battery to be charged from an external electric power supply via an external charging device. More specifically, the abnormality determination portion makes a determination on an abnormality in the electrically heated catalyst (EHC) when the external charging device is connected to the external electric power supply. That is, the abnormality determination portion makes a determination on an abnormality in the EHC when the external charging device is connected to the external electric power supply during stoppage of the vehicle. Thus, the EHC can be energized with a stable electric power, and a determination on an abnormality can be made without causing a deterioration in EV running performance. Further, a great change in temperature through the energization of the EHC from a state where the EHC is at a low temperature can be achieved by making a determination on an abnormality during stoppage of the vehicle. Therefore, a diagnosis on the function of the EHC through energization can be carried out with high resolution and high accuracy. In addition, since a diagnosis is carried out during stoppage of the vehicle, a disturbance other than energization (e.g., a decrease in the temperature of the EHC resulting from head-on wind) can be excluded from a change in the temperature of the EHC as well. Owing to the foregoing configuration, the abnormality determination apparatus for the electrically heated catalyst can make a determination on an abnormality in the EHC with high accuracy and high resolution without causing an erroneous determination while preventing a deterioration in EV running performance.

An abnormality determination method for an electrically heated catalyst according to a second aspect of the invention is an abnormality determination method for an electrically heated catalyst provided in a plug-in hybrid vehicle having a battery that is charged by connecting an external charging device to an external electric power supply. This abnormality determination method includes determining whether the external charging device is connected to the external electric power supply, and making a determination on an abnormality in the electrically heated catalyst when the external charging device is connected to the external electric power supply.

BRIEF DESCRIPTION OF THE DRAWINGS

The foregoing and/or further objects, features and advantages of the invention will become more apparent from the following description of a preferred embodiment with reference to the accompanying drawings, in which like numerals are used to represent like elements and wherein.

DETAILED DESCRIPTION OF EMBODIMENT

The preferred embodiment of the invention will be described hereinafter with reference to the drawings.

Figure 1:
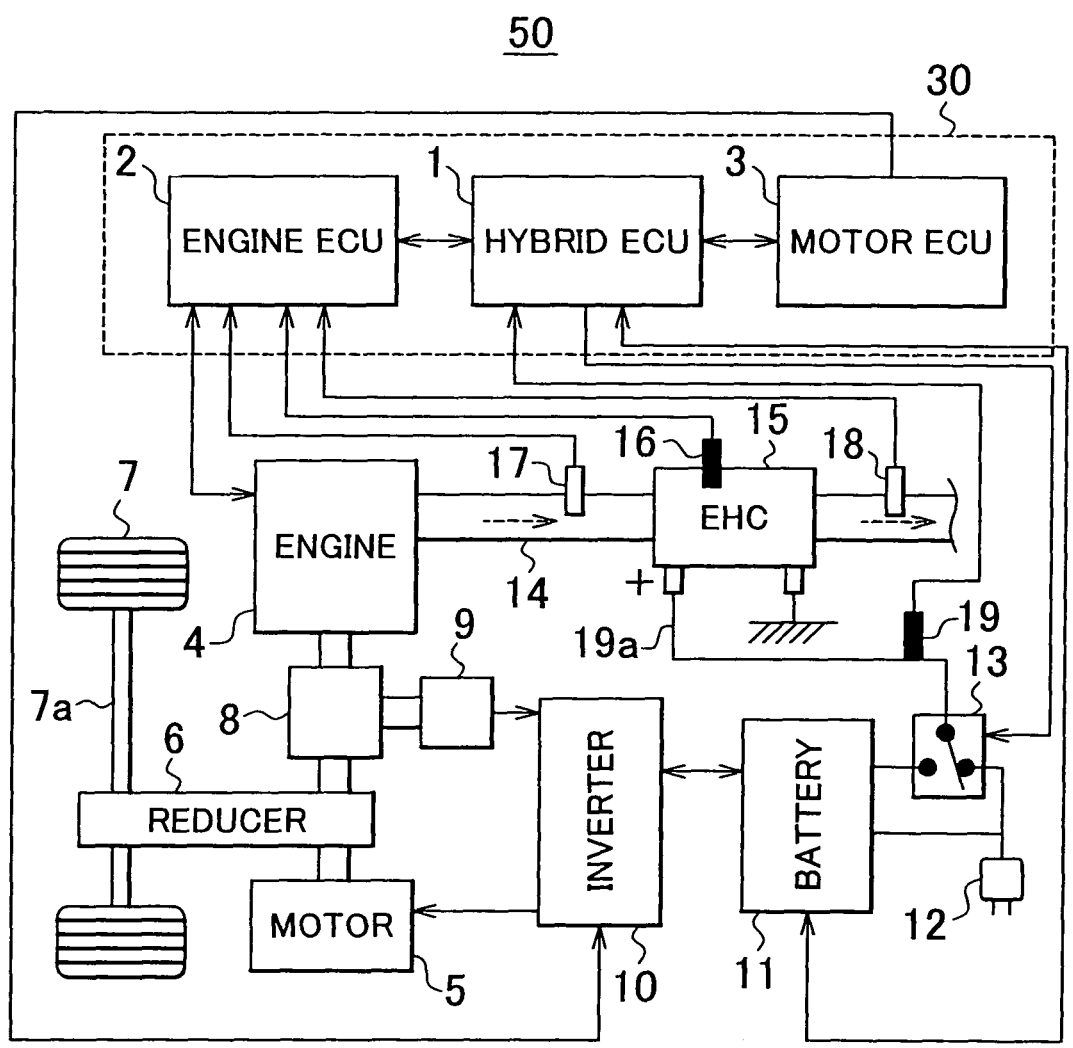
FIG. 1 shows the schematic configuration of a plug-in hybrid vehicle according to the embodiment of the invention.

First of all, referring to FIG. 1, the configuration of a plug-in hybrid vehicle according to this embodiment of the invention will be described. FIG. 1 is a conceptual view showing the configuration of an essential part of a plug-in hybrid vehicle 50 according to this embodiment of the invention.

The plug-in hybrid vehicle 50 is mainly equipped with a hybrid ECU 1, an engine ECU 2, a motor ECU 3, an engine (internal combustion engine) 4, a motor 5, a reducer 6, driving wheels 7, a power distribution mechanism 8, a generator 9, an inverter 10, a battery 11, an external charging device 12, a changeover relay 13, an exhaust passage 14, and an electrically heated catalyst (EHC) 15.

The engine 4 generates a power by causing a mixture of air and fuel to burn in combustion chambers. The engine 4 is controlled through the transmission/reception of a control signal to/from the engine ECU 2. The power distribution mechanism 8 is configured to generate a differential action, and distributes a power transmitted from the engine 4 to the generator 9 and a rotary shaft of the motor 5. The generator 9 mainly generates an electric power through the transmission of the power distributed thereto by the power distribution mechanism 8. The inverter 10 is controlled by the motor ECU 3, and gives/receives an electric power to/from the motor 5, the generator 9, and the battery 11. Basically, the inverter 10 selectively applies an electric power generated by the generator 9 to the motor 5 and the battery 11, or applies an electric power with which the battery 11 is charged to the motor 5. The motor 5 generates a driving force in the plug-in hybrid vehicle 50 through the electric power supplied via the inverter 10. Further, the motor 5 generates an electric power by performing regenerative operation at the time of braking. The reducer 6 reduces the speed of a power transmitted from the motor 5 and/or the engine 4, and transmits the power whose speed has been reduced to the driving wheels 7 via a drive shaft 7a.

The battery 11 is a rechargeable accumulator configured to be capable of functioning as an electric power supply for driving the motor 5 and various electric components (not shown) provided in the plug-in hybrid vehicle 50. More specifically, the battery 4 is charged by being supplied with an electric power from an external electric power supply (not shown) when the external charging device 12 is connected to the external electric power supply. The battery 11 is controlled through the transmission/reception of a control signal to/from the hybrid ECU 2. For example, the hybrid ECU 2 detects a charge amount (SOC) of the battery 11. The external charging device 12 is configured to be capable of charging the battery 11 with an electric power from the external electric power supply, and is endowed with a function of determining whether the external charging device 12 is connected to the external electric power supply: For example, the external charging device 12 is configured to enable power line communication (PLC).

Exhaust gas generated through combustion in the engine 4 flows through the exhaust passage 14 as indicated by broken arrows in FIG. 1. The exhaust passage 14 is provided, sequentially from an upstream side, with an A/F sensor 17 for detecting an air-fuel ratio, the EHC 15, which is configured to enable purification of exhaust gas, and an $O_2$ sensor 18 for detecting a concentration of oxygen in exhaust gas. More specifically, the EHC 15 is equipped with a catalyst capable of purifying NOx, SOx and the like in exhaust gas, an electric heater capable of heating the catalyst by being energized, and the like. For example, the EHC 15 is energized and thereby heated up to a temperature at which an optimal purification performance for exhaust gas is obtained. Further, the EHC 15 is provided with a temperature sensor 16 for detecting a temperature of the EHC 15. Detection signals detected by the temperature sensor 16, the A/F sensor 17, and the $O_2$ sensor 18 are supplied to the engine ECU 2.

Furthermore, the EHC 15 is energized with an electric power via an electric power supply line 19a and the changeover relay 13. The electric power supply line 19a is provided with a current sensor 19 configured to be capable of detecting an amount of an electric power with which the EHC 15 is energized. The current sensor 19 supplies the hybrid ECU 1 with a detection signal corresponding to a detected energization electric power amount. The changeover relay 13 is equivalent to the changeover portion in the invention, and is configured to be capable of making a changeover between connection between the EHC 15 and the external charging device 12 and connection between the EHC 15 and the battery 11. That is, the changeover relay 13 makes a changeover between energization of the EHC 15 from the external charging device 12 (in other words, from the external electric power supply) and energization of the EHC 15 from the battery 11.

The changeover relay 13 is controlled through a control signal supplied from the hybrid ECU 1. Basically, the hybrid ECU 1 sets the changeover relay 13 such that the EHC 15 is energized from the battery 11 so as to appropriately purify exhaust gas by the EHC 15 while the plug-in hybrid vehicle 50 is running (in more detail, in a situation where exhaust gas from the engine 4 is to be purified). That is, in such a situation, the hybrid ECU 1 causes the EHC 15 to purify exhaust gas by heating the EHC 15 through energization of the EHC 15 with an electric power from the battery 11. On the other hand, the hybrid ECU 1 sets the changeover relay 13 such that the EHC 15 is energized from the external charging device 12 so as to make a determination on an abnormality in the EHC 15 in a situation where the external charging device 12 is connected to the external electric power supply during stoppage of the plug-in hybrid vehicle 50. That is, in such a situation, the hybrid ECU 1 makes a determination on an abnormality in the EHC 15 by directly energizing the EHC 15 with an electric power from the external electric power supply. In more detail, the hybrid ECU 1 makes a determination on an abnormality in the EHC 15 on the basis of a heat generation amount (temperature rise amount) of the EHC 15 at the time of energization of the EHC 15.

Each of the hybrid ECU 1, the engine ECU 2, and the motor ECU 3 (which will be comprehensively referred to hereinafter simply as "an ECU 30" as well) is an electronic control unit that is equipped with a central processing unit (CPU) (not shown), a read only memory (ROM) (not shown), and a random access memory (RAM) (not shown) to control a corresponding one or corresponding ones of the respective components in the plug-in hybrid vehicle 50. More specifically, the ECU 30 performs control in a cooperative manner through the transmission/reception of signals. In this embodiment of the invention, the ECU 30 is equivalent to the abnormality determination apparatus for the electrically heated catalyst in the invention, and functions as the abnormality determination portion for making a determination on an abnormality in the EHC 15.

Next, an abnormality determination method for the EHC 15 according to this embodiment of the invention will be described concretely. In this embodiment of the invention, the ECU 30 makes a determination on an abnormality in the EHC 15 when the external charging device 12 is connected to the external electric power supply during stoppage of the plug-in hybrid vehicle 50. That is, the ECU 30 makes a determination on an abnormality by directly energizing the EHC 15 with an electric power from the external electric power supply via the external charging device 12. More specifically, the ECU 30 starts energizing the EHC 15 from the external electric power supply by changing over the changeover relay 13 such that the EHC 15 and the external charging device 12 are connected to each other after the battery 11 has been charged and the EHC 15 has been cooled to or below a predetermined temperature. This is because of the purposes of making a determination on an abnormality after the charging of the battery 11 has definitely been completed and making a determination on an abnormality on a condition that allows a change in temperature (heat generation amount) to be obtained with the accuracy in making a determination on an abnormality ensured through energization of the EHC 15.

In energizing the EHC 15 as described above, the ECU 30 then acquires an energization electric power amount of the EHC 15 from the current sensor 19, and acquires a temperature of the EHC 15 (hereinafter referred to as "the EHC temperature") from the temperature sensor 16. After that, the ECU 30 terminates energization of the EHC 15 when an integrated value of the energization electric power amount of the EHC 15 (hereinafter referred to as "the EHC integrated energization electric power amount") reaches a predetermined value. At this time, the ECU 30 makes a determination on an abnormality in the EHC 15 by determining from the acquired EHC temperature whether heat generation of the ECU 15 corresponding to the EHC integrated energization electric power amount has been obtained, more specifically, by determining whether the heat generation amount (temperature rise amount) of the EHC 15 is equal to or larger than a predetermined value. In this case, the ECU 30 determines that the EHC 15 is normal when the heat generation amount of the EHC 15 is equal to or larger than the predetermined value, and determines that the EHC 15 is abnormal when the heat generation amount of the EHC 15 is smaller than the predetermined value.

As described above, according to this embodiment of the invention, the EHC 15 can be energized with an extremely stable electric power, and the electric power of the battery 11 can be prevented from decreasing through energization of the EHC 15, by making a determination on an abnormality through energization of the EHC 15 from the external electric power supply. That is, a determination on an abnormality in the EHC 15 can be made on an extremely stable condition, and a determination on an abnormality can be made without causing a deterioration in EV running performance. Further, a great change in temperature through energization of the EHC 15 can be obtained from a state where the EHC temperature is low, and a diagnosis of the function in the EHC 15 through energization can be carried out with high resolution and high accuracy, by making a determination on an abnormality during stoppage of the plug-in hybrid vehicle 50. In addition, a disturbance other than energization (e.g., a decrease in the EHC temperature resulting from head-on wind or the like) can be excluded to the maximum possible extent from the change in the temperature of the EHC 15 as well, by making a determination on an abnormality during stoppage of the plug-in hybrid vehicle 50.

As described above, the abnormality determination method for the EHC 15 according to this embodiment of the invention makes it possible to make a determination on an abnormality in the EHC 15 with high accuracy and high resolution without causing an erroneous determination while preventing a deterioration in EV running performance.

Figure 2A:
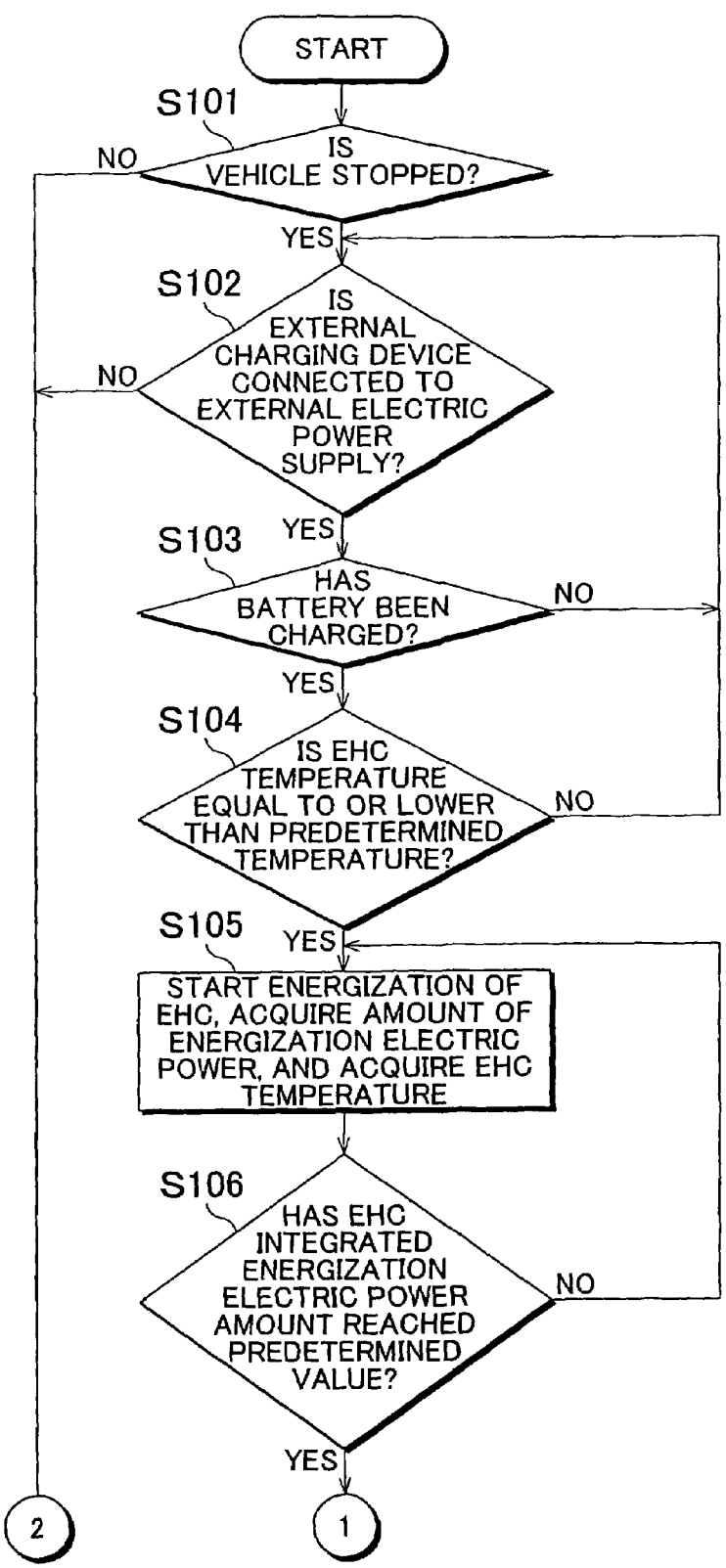
FIG. 2A and FIG. 2B are a flowchart showing an abnormality determination processing for an EHC according to the embodiment of the invention.
Figure 2B:
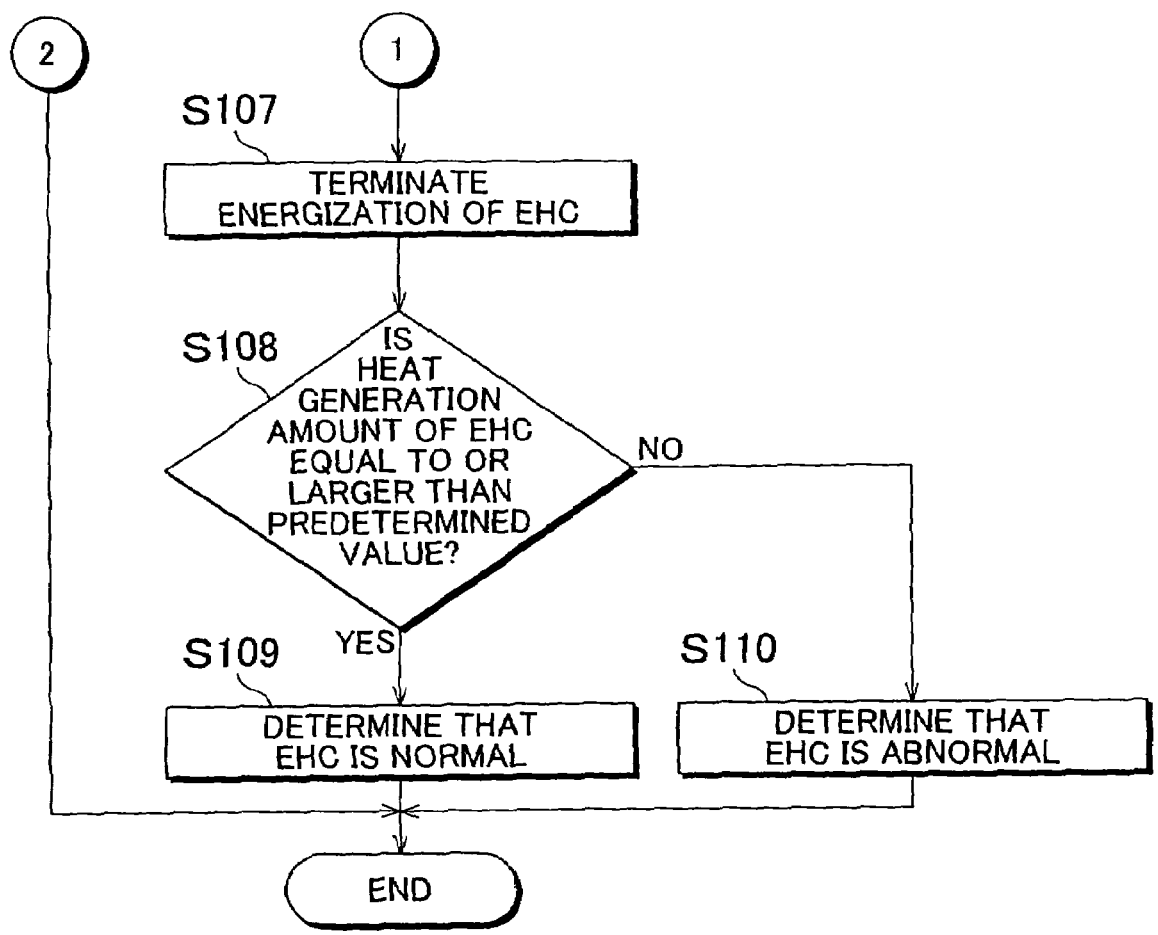

Next, an abnormality determination processing for the EHC 15 according to this embodiment of the invention will be described with reference to FIG. 2A and FIG. 2B. FIG. 2A and FIG. 2B are a flowchart showing the abnormality determination processing for the EHC 15. This processing is mainly performed by the ECU 30 repeatedly on a predetermined cycle.

First of all, in step S101, the ECU 30 determines whether the plug-in hybrid vehicle 50 is stopped. More specifically, the ECU 30 determines, on the basis of states of the engine 4, the motor 5, and the driving wheels 7, whether the plug-in hybrid vehicle 50 is stopped (in other words, determines whether the plug-in hybrid vehicle 50 is being soaked). When the plug-in hybrid vehicle 50 is stopped (step S101; Yes), the processing proceeds to step S102. When the plug-in hybrid vehicle 50 is not stopped (step S101; No), the processing exits the present flow.

In step S102, the ECU 30 determines whether the external charging device 12 is connected to the external electric power supply. When the external charging device 12 is connected to the external electric power supply (step S102; Yes), the processing proceeds to step S103. When the external charging device 12 is not connected to the external electric power supply (step S102; No), the processing exits the present flow.

In step S103, the ECU 30 determines whether the battery 11 has been charged. For example, the hybrid ECU 2 makes this determination on the basis of a charging amount of the battery 11. This determination is made so as to make a determination on an abnormality in the EHC 15 after the charging of the battery 11 has definitely been completed. When the battery 11 has been charged (step S103; Yes), the processing proceeds to step S104. On the other hand, when the battery 11 has not been charged (step S103; No), the processing returns to step S102. That is, the ECU 30 does not make a determination on an abnormality in the EHC 15, namely, does not start energizing the EHC 15 until the battery 11 has been charged.

In step S104, the ECU 30 determines whether the EHC 15 has been cooled to or below a predetermined temperature. This predetermined temperature is equivalent to an EHC temperature at the time of the start of a determination on an abnormality that allows a change in temperature (heat generation amount) to be obtained with the accuracy in making a determination on an abnormality ensured through energization of the EHC 15. That is, in step S104, the ECU 30 determines whether a condition making it possible to obtain a sufficient change in temperature through energization of the EHC 15 has been fulfilled. When the EHC temperature is equal to or lower than the predetermined temperature (step S104; Yes), the processing proceeds to step S105. On the other hand, when the EHC temperature is higher than the predetermined temperature (step S104; No), the processing returns to step S102. That is, the ECU 30 does not make a determination on an abnormality in the EHC 15, namely, does not start energizing the EHC 15 until the EHC temperature becomes equal to or lower than the predetermined temperature.

In step S105, the ECU 30 starts energizing the EHC 15. More specifically, the hybrid ECU 1 starts energizing the EHC 15 from the external electric power supply by changing over the changeover relay 13 such that the EHC 15 and the external charging device 12 are connected to each other. That is, the hybrid ECU 1 starts energizing the EHC 15 by changing over the changeover relay 13 from connection between the EHC 15 and the battery 11 to connection between the EHC 15 and the external charging device 12. Then, after having thus started energizing the EHC 15, the ECU 30 acquires an energization electric power amount of the EHC 15 from the current sensor 19, and acquires the EHC temperature from the temperature sensor 16. When the foregoing processing steps are terminated, the processing proceeds to step S106.

In step S106, the ECU 30 determines whether an integrated value of the energization electric power amount of the EHC 15 (the EHC integrated energization electric power amount) has reached a predetermined value. This predetermined value is equivalent to an integrated value of an energization electric power amount that makes it possible to obtain a sufficient change in temperature through energization of the EHC 15 (in other words, a sufficient heat generation amount of the EHC 15). When the EHC integrated energization electric power amount has reached the predetermined value (step S106; Yes), the processing proceeds to step S107. In this case, the ECU 30 terminates energization of the EHC 15 (step S107). The processing then proceeds to step S108. On the other hand, when the EHC integrated energization electric power amount has not reached the predetermined value (step S106; No), the processing returns to step S105. In this case, the ECU 30 continues to energize the EHC 15 and repeatedly acquires the energization electric power amount of the EHC 15 and the EHC temperature until the EHC integrated energization electric power amount reaches the predetermined value.

In step S108, the ECU 30 makes a determination on an abnormality in the EHC 15. More specifically, the ECU 30 determines from the EHC temperature acquired in step S105 whether the heat generation amount (temperature rise amount) of the EHC 15 is equal to or larger than a predetermined value. This predetermined value is set on the basis of a heat generation amount of the EHC 15 that corresponds to an EHC integrated energization electric power amount in the case where the EHC 15 is normal. That is, in step S108, the ECU 30 makes a determination on an abnormality in the EHC 15 by determining whether heat generation of the EHC 15 that corresponds to the EHC integrated energization electric power amount has been obtained.

When the heat generation amount of the EHC 15 is equal to or larger than the predetermined value (step S108; Yes), the processing proceeds to step S109. In this case, the ECU 30 determines that the EHC 15 is normal (step S109). The processing then exits the present flow. On the other hand, when the heat generation amount of the EHC 15 is smaller than the predetermined value (step S108; No), the processing proceeds to step S110. In this case, the ECU 30 determines that the EHC 15 is abnormal (step S110). The processing then exits the present flow.

The aforementioned abnormality determination processing for the EHC 15 makes it possible to make a determination on an abnormality in the EHC 15 with high accuracy and high resolution without causing an erroneous determination while preventing a deterioration in EV running performance.

The foregoing description shows an example in which a determination on an abnormality is made by directly energizing the EHC 15 with an electric power from the external electric power supply via the external charging device 12, but the invention is not limited to this example. In another example, a determination on an abnormality in the EHC 15 can be made by energizing the EHC 15 with an electric power from the external electric power supply via the battery 11. That is, a determination on an abnormality may be made by energizing the EHC 15 with an electric power temporarily accumulated in the battery 11 from the external electric power supply when the external charging device 12 is connected to the external electric power supply during stoppage of the plug-in hybrid vehicle 50.

Further, the foregoing description shows an example in which a determination on an abnormality in the EHC 15 is made after the battery 11 has been charged, but the invention is not limited to this example. In another example, a determination on an abnormality can be made before the battery 11 is charged unless a determination on an abnormality is made with a predetermined frequency. For example, a determination on an abnormality can be made before the charging of the battery 11 is started. In still another example, a determination on an abnormality can be made as soon as the EHC 15 is cooled to or below a predetermined temperature even when the battery 11 has not been charged. In this case, the battery 11 is charged until the EHC 15 is cooled to or below the predetermined temperature, a determination on an abnormality is made after the EHC 15 has been cooled to or below the predetermined temperature, and the charging of the battery 11 is resumed after the determination on the abnormality has been terminated.

Further, the foregoing description shows a configuration in which the EHC 15 is directly supplied with an electric power from the external electric power supply via the external charging device 12 (see FIG. 1), but a device allowing arbitrary selection of the voltage supplied from the external electric power supply in accordance with the characteristic of the EHC 15 may be added. That is, a voltage from the external electric power supply may be, for example, raised/lowered and then supplied to the EHC 15.

Furthermore, the foregoing description shows an example in which a determination on an abnormality in the EHC 15 is made by determining whether the heat generation amount of the EHC 15 is equal to or larger than the predetermined value (in other words, by determining whether heat generation corresponding to the EHC integrated energization electric power amount has been obtained), but the invention is not limited to this example. That is, the invention is not limited to the use of the energization electric power amount of the EHC 15 acquired from the current sensor 19 and the EHC temperature acquired from the temperature sensor 16 as the operating state of the EHC 15. In another example, a determination on an abnormality can be made using a catalyst resistance, a catalyst electric power consumption, and the like of the EHC 15 as the operating state of the EHC 15. Further, an EHC temperature may be obtained through calculation from a voltage value, a current value, or the like instead of being directly detected.

While the invention has been described with reference to the example embodiment thereof, it should be understood that the invention is not limited to the example embodiment or the construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

What is claimed is:

1. An abnormality determination apparatus for an electrically heated catalyst provided in a plug-in hybrid vehicle having a battery that is charged by connecting an external charging device to an external electric power supply, comprising:
an electronic control unit that includes control logic that, when executed, causes the electronic control unit to act as an abnormality determination portion that is configured to make a determination on an abnormality in the electrically heated catalyst when the external charging device is connected to the external electric power supply;
wherein the abnormality determination portion is configured to make the determination on the abnormality after the electrically heated catalyst has been cooled to or below a predetermined temperature.

2. The abnormality determination apparatus for the electrically heated catalyst according to claim 1, wherein the electronic control unit includes control logic that, when executed, causes the electronic control unit to act as a voltage modulation portion that modulates a voltage of the external electric power supply,
wherein the abnormality determination portion is configured to make the determination on the abnormality by energizing the electrically heated catalyst with an electric power from the external electric power supply after a voltage of the electric power is modulated via the voltage modulation portion.

3. The abnormality determination apparatus for the electrically heated catalyst according to claim 1, further comprising a relay that includes control logic that, when executed, causes the relay to act as a changeover portion that makes a changeover between energization of the electrically heated catalyst from the external electric power supply and energization of the electrically heated catalyst from the battery.

4. The abnormality determination apparatus for the electrically heated catalyst according to claim 3, wherein the changeover is so set in the changeover portion as to energize the electrically heated catalyst from the battery while the vehicle is running, and to energize the electrically heated catalyst from the external electric power supply when the external charging device is connected to the external electric power supply.

5. The abnormality determination apparatus for the electrically heated catalyst according to claim 1, wherein the abnormality determination portion is configured to make the determination on the abnormality during stoppage of the vehicle.

6. The abnormality determination apparatus for the electrically heated catalyst according to claim 1, wherein the predetermined temperature is a temperature that enables a determination on a heat generation amount of the electrically heated catalyst when the electrically heated catalyst is energized in the determination on the abnormality.

7. The abnormality determination apparatus for the electrically heated catalyst according to claim 1, wherein the abnormality determination portion is configured to make the determination on the abnormality on a basis of an operating state of the electrically heated catalyst at a time of energization of the electrically heated catalyst.

8. The abnormality determination apparatus for the electrically heated catalyst according to claim 7, wherein the operating state is at least one of a catalyst resistance and a catalyst electric power consumption.

9. The abnormality determination apparatus for the electrically heated catalyst according to claim 1, wherein the abnormality determination portion is configured to make a determination on an abnormality on a basis of an amount of an electric power with which the electrically heated catalyst is energized from the external electric power supply and an amount of heat generation resulting from energization of the electrically heated catalyst.

10. The abnormality determination apparatus for the electrically heated catalyst according to claim 1, further comprising a temperature sensor that detects a temperature of the electrically heated catalyst, wherein an electronic control unit that includes control logic, which when executed, is configured to make the determination on the abnormality.

11. The abnormality determination apparatus for the electrically heated catalyst according to claim 1, wherein the battery is charged until the electrically heated catalyst is cooled to or below the predetermined temperature.

12. The abnormality determination apparatus for the electrically heated catalyst according to claim 1, wherein the electrically heated catalyst is energized with an electric power from the external electric power supply via the battery.

13. The abnormality determination apparatus for the electrically heated catalyst according to claim 1, wherein the abnormality determination portion is configured to make the determination on the abnormality after the battery has been fully charged.

14. An abnormality determination method for an electrically heated catalyst provided in a plug-in hybrid vehicle having a battery that is charged by connecting an external charging device to an external electric power supply, the method comprising:
determining whether the external charging device is connected to the external electric power supply;
determining whether the electrically heated catalyst has been cooled to or below a predetermined temperature; and
making a determination on an abnormality in the electrically heated catalyst when the external charging device is connected to the external electric power supply and when the electrically heated catalyst has been cooled to or below the predetermined temperature.

15. The abnormality determination method for the electrically heated catalyst according to claim 14, further comprising:
determining whether the battery has been fully charged; and
making a determination on an abnormality in the electrically heated catalyst by energizing the electrically heated catalyst with an electric power from the external electric power supply when the external charging device is connected to the external electric power supply, when the battery has been fully charged, and when the electrically heated catalyst has been cooled to or below the predetermined temperature.

16. The abnormality determination method for the electrically heated catalyst according to claim 15, wherein the determination on the abnormality is determined, on a basis of an amount of an electric power with which the electrically heated catalyst is energized and an amount of heat generation resulting from energization of the electrically heated catalyst, that the electrically heated catalyst is normal when the amount of heat generation is equal to or larger than a predetermined value.

17. The abnormality determination method for the electrically heated catalyst according to claim 14, further comprising:

energizing the electrically heated catalyst with an electric power from the external electric power supply via the battery.

* * * * *